B. W. KADEL.
RAILWAY CAR AND TRUCK CONSTRUCTION.
APPLICATION FILED MAY 17, 1916.
1,213,205.
Patented Jan. 23, 1917.
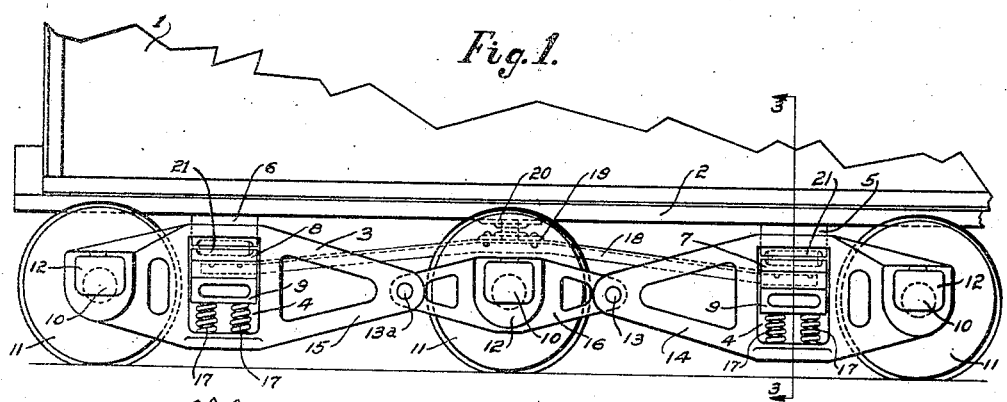
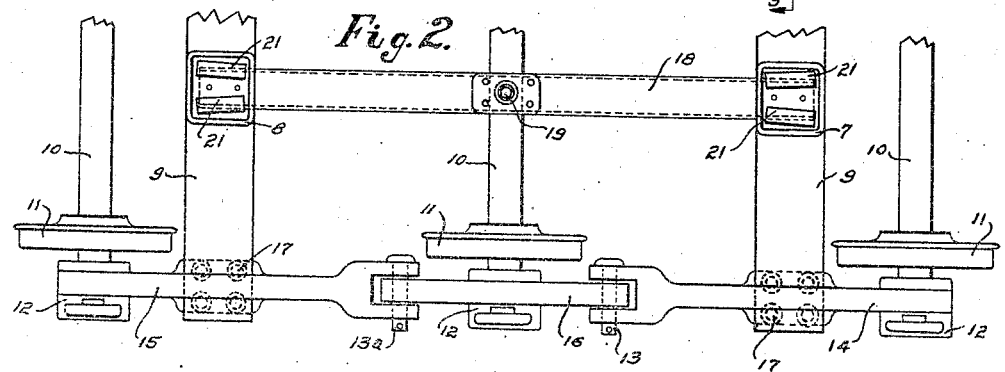
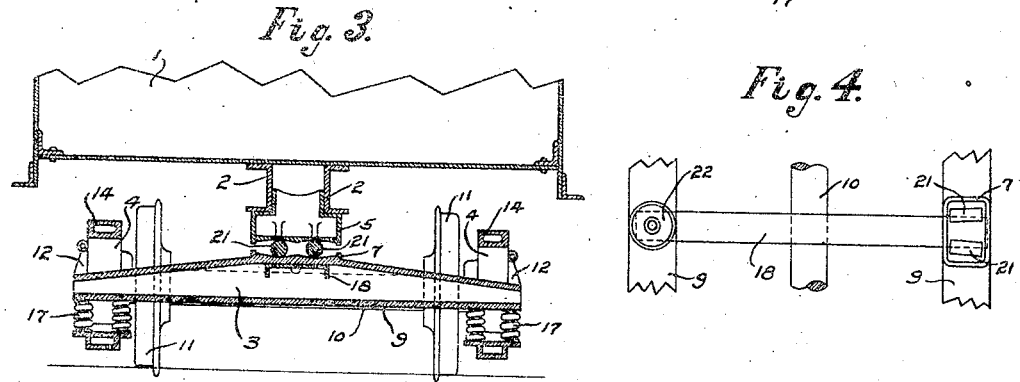
Witnesses
Earl W. Fisher
W. A. McBurney
Inventor
B. W. Kadel.

UNITED STATES PATENT OFFICE.

BYERS W. KADEL, OF ROANOKE COUNTY, VIRGINIA.

RAILWAY CAR AND TRUCK CONSTRUCTION.

1,213,205.            Specification of Letters Patent.     Patented Jan. 23, 1917.

Application filed May 17, 1916. Serial No. 98,037.

*To all whom it may concern:*

Be it known that I, BYERS W. KADEL, a citizen of the United States, residing in Roanoke county, State of Virginia, have invented certain new and useful Improvements in Railway Car and Truck Construction, of which the following is a specification.

The present invention has to do with supporting car bodies and delivering the load therefrom to the rail and among the objects thereof is to provide improvements in supporting and equalizing means therefor.

The invention consists in the novel features of car body and truck construction as will be herein set forth and as particularly claimed.

In the accompanying drawings, Figure 1 is a side elevational view of a portion of a car body with a truck under the same, the features of my invention being disclosed in part in the same. Fig. 2 is a plan view of the particular truck of Fig. 1, the car body having been omitted for the purpose of clearness. Fig. 3 is a transverse vertical section of the truck, taken approximately on the line 3—3 of Fig. 1. Fig. 4 is a broken plan view showing slightly modified features over those of Fig. 2.

In these drawings similar reference numerals designate like parts.

Referring to Fig. 1, I have shown at 1 a portion of a car body having draft sills 2, and with a supporting truck 3 under one end thereof. It will be understood that the other end of the body 1 may be supplied with a similar truck which will be constructed in the same manner, a description of one end of the car with its truck thus sufficing. The truck 3 is so constructed that it may swivel under the car body as on horizontal curves. Where two such trucks are used each may swivel without respect to the other as they are not connected together except through the car body.

I provide on the under face of the car body, preferably just beneath the draft sills 2 a plurality of load delivering seats 5, 6, and the truck 3 is provided with coöperatively formed load receiving seats 7, 8, the same being alined and disposed beneath the seats 5, 6. These seats are spaced apart longitudinally of the car with respect to each other and extending transversely of the car beneath each seat is a cross bolster 9, the same carrying the load receiving seats of the truck. These cross bolsters are carried at their ends on suitable equalizing and supporting means so that the load from the car body may be equalized among truck axles 10. The trucks are supplied with the customary wheels 11 which are mounted on these axles and the axles are journaled in oil boxes 12 which rest thereon and impart loads thereto.

The supporting means in the present instance consists of side frames disposed along each side of the truck and outside of the lines of the wheels. These support the cross bolsters and are each formed in three units, the end units 14 and 15 having secured to their outer ends the oil boxes for the end axles of the truck, an intermediate unit 16 carrying an oil box for the middle truck axle. This intermediate frame section is rotatable with respect to the middle axle and supports the inner ends of the end units 14 and 15 of the frame at 13 and 13$^a$, the points of support thereon being spaced from each other longitudinally of the truck and being located at each side of the center thereof.

Each of the frame units being affixed to an oil box is capable of some rotation with its oil box about their respective axles as centers. And in the present embodiment it is by means of this that equalization is effected for it will be seen that when a certain load is applied at the seat 7 it will be equalized between the ends of that cross bolster 9. The proportion of the frame unit 14 is such that two-thirds of the load of the end of the cross bolster will be transferred to the end oil box and one-third to the end of the frame unit 16 at 13. This load at the end of the unit 16 will tend to rotate that end of the same downward about the middle axle, the unit 14 rotating slightly about the end axle, and the opposite end of the unit 16 at 13$^a$ raising correspondingly and rotating the frame unit 15 about the other end axle. The other cross bolster 9 will thus be raised until the seats 6 and 8 bear together, and because of the proportion of the frame units the load of that entire end of the car body will be equalized among the three axles. At the same time the reactions of the seats 7 and 8 against 5 and 6 will be back-equalized so that no matter what variations there may be in the manufacture of parts or in the longitudinal tilting of car body and trucks the loads will at all times be equally distributed among the three axles.

For six wheel truck construction such as shown in the drawings there may be employed two cross bolsters 9 and a load seat for each, these cross bolsters passing along either side of the middle truck wheel. The end frame units are provided with suitable bolster openings 4 to receive the ends of the cross bolsters 9 and springs 17 are inserted between the load seat on the bottom frame member and the seat on the under face of the bolster end. The cross bolsters 9 may be tied together by any relatively flexible means such as the channel 18 and this member 18 may carry a swivel center such as 19 to coöperate with a corresponding center 20 on the under face of the car body. There is no vertical load, however, carried at this swivel center. Rollers 21 or other anti-friction means may be interposed between the load seats. As indicated in Figs. 1 and 2 the swivel center 19—20 may carry means for retaining the car body upon the truck and as indicated further in these figures the roller seats 5, 6, 7 and 8 may also carry flanges to overlap the rollers 21 and thereby serve as additional means to retain the truck under the car.

It is not necessary that the swivel point, 19—20, which corresponds to the ordinary truck center, should be mid-way between the cross bolsters; it may be located, as in Fig. 4, at any point along the truck, in which figure the load seat 6—8 is shown as a swiveling center plate arrangement (designated 22 in Fig. 4) and the seat 5—7 as a roller bearing seat, the swiveling here occurring about the seat 22 as a center. Such a center plate arrangement is in itself an anti-friction device. The rollers 21 are preferably set at an angle so as to direct the swiveling about the swivel center and the seats 5—6—7 and 8 therefor may be made on inclined planes to offer some slight resistance to swiveling out of the normal position.

Thus I have described an embodiment of my invention. It will be realized that various embodiments are possible within the scope of the appended claiming without departing from the spirit thereof.

What I claim is:

1. In railway car and truck construction, a car body, a supporting truck under each end of the same, each truck being capable of swiveling under the car body and there being a plurality of seats on each truck at spaced intervals longitudinally of the body for receiving the load from the car body, with coöperatively formed and disposed load delivering seats on the body, each truck embodying means for equalizing the loads delivered thereto among all the wheels of that truck and for equalizing the reactions between all of the said load seats at that end of the car.

2. In railway car and truck construction, a car body, a supporting truck under each end of the same, each truck being capable of swiveling under the car body and there being a plurality of seats on each truck at spaced intervals longitudinally of the body for receiving the load from the car body, with coöperatively formed and disposed load delivering seats on the body having centrally disposed draft sills, each truck embodying means for equalizing the loads delivered thereto among all the wheels of that truck and for equalizing the reactions between all of the said load seats at that end of the car, the truck at one end not being connected to the one at the other end except through the body and the said trucks being free to swivel independently of each other.

3. In railway car and truck construction, a car body, a swiveling supporting truck under each end of the same, each of said trucks embodying side frames, a plurality of cross bolsters extending transversely of the truck at spaced intervals and supported by the said side frames, each of the cross bolsters being provided with means thereon for receiving portions of the load directly from the car body, coöperatively formed and disposed load delivering means on the under face of the car body, and means in connection with said side frames for delivering the cross bolster loads to the truck wheels, for equalizing it therebetween, and for equalizing the reactions between the said load delivering means on an end of the car body.

4. In railway car and truck construction, a car body, a swiveling supporting truck under each end of the same, each of said trucks embodying the customary wheels and axles together with oil boxes therefor, a plurality of side members along each side of each truck, the same comprising end units and intermediate units, the oil boxes for the end axles being rigidly secured to and supporting the outer ends of the end units and the oil boxes for the intermediate axles being rigidly secured to and supporting the intermediate units, the inner ends of the end units resting upon and being supported by the intermediate units at spaced points longitudinally thereof, the intermediate units being rotatable with respect to the middle axle, cross bolsters extending transversely of the car from side members to side members, the ends of the same being supported upon the said end units thereof, and means on each of said cross bolsters for receiving a portion of the car body load, there being coöperatively formed means on the under face of the car body for delivering such loads directly thereto.

5. In railway car and truck construction, a car body, a supporting truck under each end of the same, each of said trucks embodying wheels, axles and oil boxes, the oil boxes being mounted upon the axles outside the lines of the wheels, side frame members supported upon the oil boxes and likewise disposed outside of the truck wheels, each of said side frames being composed of two end units and an intermediate unit, the end units carrying at their outer ends the oil boxes for one end of the outer axles, the intermediate unit carrying the oil box for the corresponding end of the middle axle, the oil boxes in each instance being secured to the respective one of the said frame units and the entire frame unit and oil box being rotatable about its respective axle, two cross bolsters extending transversely of the car at spaced intervals longitudinally of the same and along either side of the middle truck wheels, said cross bolsters being supported upon the end units of the said frames and the inner ends of said end units in turn upon the said intermediate unit, load-receiving means on each cross bolster and coöperatively formed and alined means on the car body for imparting portions of the car body load directly from the car body to the cross bolsters.

6. In railway car and truck construction, a car body, a supporting truck under each end of the same and capable of swiveling in a horizontal plane with respect thereto, each truck embodying a pair of cross bolsters disposed transversely of the car and at spaced intervals longitudinally thereof, coöperating means on the under side of the car body and on each cross bolster for applying the load of the car body to the said cross bolsters, means within the truck for supporting the cross bolsters, for transferring the loads therefrom to the truck wheels and equalizing it thereamong and for equalizing the reactions between the points on the under side of one end of the car body, there being springs interposed between the said cross bolsters and the load supporting and equalizing means.

7. In railway car and truck construction, a car body, a supporting truck therefor, means on the car body for delivering the loads of the car body to the said truck at a plurality of points spaced longitudinally of the car one from another, a cross bolster under each of said points having coöperating means on the same for receiving such loads directly from the car body, a plurality of wheels, axles and oil boxes, a series of supporting and equalizing members resting upon and attached to the oil boxes and being rotatable therewith, for the purpose of equalization, about the axles as a center, the said cross bolsters being supported by the said supporting and equalizing means.

8. In railway car and truck construction a car body having a plurality of load transferring seats on the under face thereof, and disposed at spaced intervals longitudinally of the car, a supporting truck for the same, having coöperatively formed and disposed load receiving seats, a cross beam supporting each load receiving seat, wheels, axles and oil boxes of the customary construction, articulated side members supporting the cross beams, the oil boxes supporting the side members and having with the side frames rotatable movement about their respective axles in such manner as to equalize the wheel loads and to equalize the reactions between the load transferring seats.

9. In railway car and truck construction, a car body, a supporting truck under each end of the same, each truck being capable of swiveling under the car body and there being a plurality of seats on each truck at spaced intervals longitudinally of the body, for receiving the load from the car body, with coöperatively formed and disposed load delivering seats on the body, and means within each truck for equalizing the load thereof among all the wheels of that truck and for equalizing the reactions between all of the said load seats at that end of the car, the said load seats being provided with anti-friction means therebetween.

10. In railway car and truck construction, a car body, a supporting truck under each end of the same, each truck being capable of swiveling under the car body and there being a plurality of seats on each truck at spaced intervals longitudinally of the body for receiving the load from the car body, with coöperatively formed and disposed load delivering seats on the body, and means within each truck for equalizing the load thereof among all the wheels of that truck and for equalizing the reactions between all of the said load seats at that end of the car, the said load seats being provided with rollers therebetween and with the bearings for said rollers on planes formed to cause raising of the load when the said truck swivels out of the normal line.

11. In railway car and truck construction, a car body, a supporting truck under each end of the same, each truck being capable of swiveling under the car body and there being a plurality of seats on each truck at spaced intervals longitudinally of the body for receiving the load from the car body, with coöperatively formed and disposed load delivering seats on the body, each truck embodying means for equalizing the loads delivered thereto among all the wheels of that truck and for equalizing the reactions between all of the said load seats at that end of the car, and a non-load supporting swivel point mediate the said load seats.

12. In railway car and truck construction, a car body, a supporting truck for the same, a plurality of load delivering seats on the under face of the car body and a corresponding number of coöperatively formed and disposed load receiving seats on the said truck, the said seats being located at spaced intervals longitudinally of the car with respect to each other, a transversely disposed cross bolster under each load receiving seat adapted to support the same, side members for supporting the ends of the cross bolsters, said side members being formed in such manner as to serve with the cross bolsters to equalize the loads from the car body among all of the truck wheels and to equalize the reaction among all of the said load seats.

In testimony whereof I affix my signature in presence of two witnesses.

BYERS W. KADEL.

Witnesses.
　A. K. SIMMONS,
　EARL H. FISHER.